Feb. 10, 1970  P. R. CORLYON  3,494,052
MOTION SYSTEM
Filed April 10, 1967  3 Sheets-Sheet 1

Inventor
PHILLIP R. CORLYON
By William Grobman
Attorney

Feb. 10, 1970      P. R. CORLYON      3,494,052
MOTION SYSTEM
Filed April 10, 1967      3 Sheets-Sheet 2

INVENTOR.
PHILLIP R. CORLYON
BY
*William Grobman*

Feb. 10, 1970 P. R. CORLYON 3,494,052
MOTION SYSTEM
Filed April 10, 1967 3 Sheets-Sheet 3

INVENTOR
PHILLIP R. CORLYON

United States Patent Office 3,494,052
Patented Feb. 10, 1970

3,494,052
MOTION SYSTEM
Phillip R. Corlyon, Conklin, N.Y., assignor to Singer-General Precision, Inc., a corporation of Delaware
Filed Apr. 10, 1967, Ser. No. 629,502
Int. Cl. G09b 9/08
U.S. Cl. 35—12                     6 Claims

ABSTRACT OF THE DISCLOSURE

For realistic training purposes most fixed-base vehicle trainers include means for producting motion in various degrees of freedom. In some of the simpler fixed-base vehicle trainers, motion in three degrees of freedom is considered to be quite satisfactory. These three degrees of freedom can be, for example, pitch, rolls and yaw. This invention relates to simple and inexpensive mechanisms for producing motion for training purposes in three degrees of freedom. One system utilizes electric drive means combined with appropriate gearing, such as a harmonic drive gear box, driving a drum pulley about which is wrapped a steel cable. The two ends of the cable are fastened to spaced points on the platform which supports a cockpit or other vehicle body. This construction is utilized for both pitch and roll. A third motor which drives a pulley which runs about the inside of a standard V-belt and travels about a fixed pulley is used for yaw. The overall assembly provides an inexpensive, simple motion system with readily controllable movement with good acceleration cues, a lack of lost motion, and quiet operation.

---

This invention relates to vehicle trainers, and more particularly to systems for producing realistic motion in such training devices.

In the past most vehicle trainers which have fixed bases; that is, most trainers which are semi-permanently mounted or secured to a permanent floor, have been provided with various types of motion systems to produce realistic movements which aid substantially in the training process. Most of the motion systems utilize hydraulic drive means for smooth and quiet operation and to carry the heavier loads which are becoming more prevalent in the modern trainers. However, there are many disadvantages to the use of hydraulic drive means in motion systems. In addition to the threat of a line break, the normal leakage inherent in hydraulic systems poses a constant problem. The hydraulic cylinders, together with the hydraulic pumps and control means therefor, are expensive, noisy, fragile, and subject to ready contamination. In a large, complex and expensive training device, the use of hydraulic drive means may be justified, but for smaller, simpler and inexpensive trainers, other means for accomplishing satisfactory results must be found.

It is an object of this invention to provide a new and improved motion system.

It is another object of this invention to provide a new and improved motion system for small, lightweight, and inexpensive trainers.

It is a further object of this invention to provide a new and improved motion system for fixed-base vehicle trainers, which system is inexpensive to construct, rugged and reliable, quite in operation, and inexpensive to maintain.

Other objects and advantages of this invention will become more apparent as the following description proceeds, which description should be considered together with the accompanying drawings in which.

Figure 1:
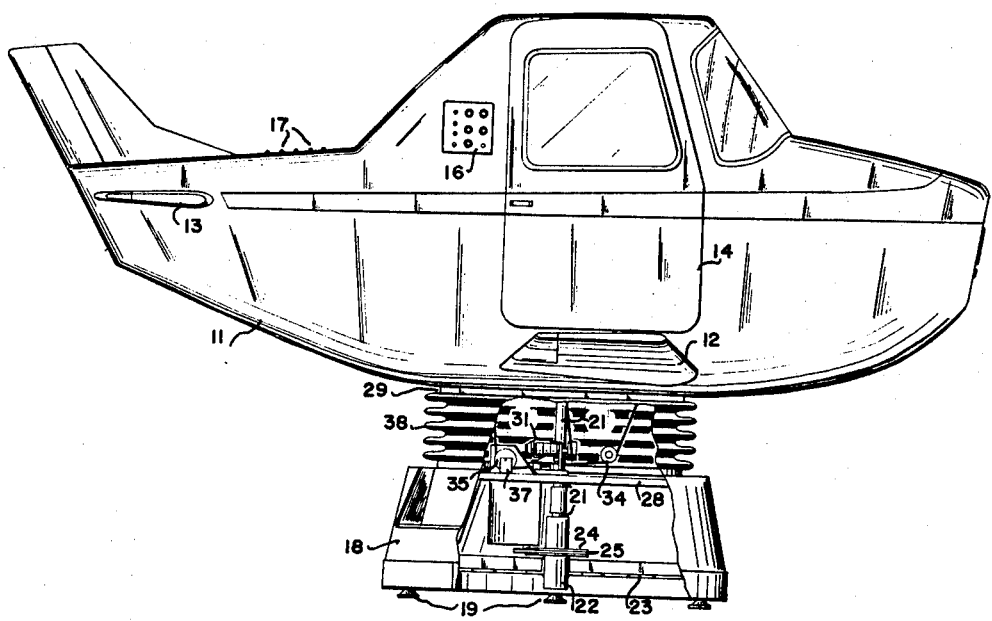
FIG. 1 is an elevational view of a trainer broadly showing one embodiment of this invention.

Referring now to the drawings in detail and more particularly to FIG. 1, the reference character 11 designates the cockpit of a fixed-base aviation trainer, or the body of any similar vehicle trainer. The particular cockpit shown comprises wings 12, a tail section 13, a side door 14 for access to the interior thereof, and a windshield 15. In addition, an instructor's control panel 16 is mounted on the exterior of the cockpit and tell-tale lights 17 are supported on the rear portion of the cockpit 11. The cockpit 11 is supported on a base 18 which includes feet 19. A central rotating shaft 21 is supported in a main bearing assembly 22 which is welded or otherwise attached to legs 23. In FIG. 1, only two legs are shown, but it is preferable that four legs be used, although a wide variety of numbers of legs are feasible. Also carried by the bearing assembly 22 is a large pulley 24 which is rigidly attached thereto. A belt 25 passes around the pulley 24 and about a second pulley 26 which is mounted on the end of the shaft of a motor drive 27, mounted on a lower platform 28. The cockpit 11 is carried directly on an upper platform 29 which is universally mounted on the shaft 21. The lower platform 28 also supports a motor and gear box system 31 which drives a spiral drum 32 over which a cable 33 passes. A second spiral pulley 34, driven by a motor which is not shown in FIG. 1, has wrapped about it a cable 36 which passes over an idler pulley 35 and is attached at its two ends to the upper platforms 29. The entire mechanism is covered by a flexible shroud 38.

FIG. 1 illustrates the relationship of many of the parts of one of the motion systems of this invention to the base 18 and to the cockpit 11. Since the details of structure shown in FIG. 1 are meager and are better shown in FIG. 4, the explanation of their operation will be presented when that latter figure is discussed.

Figure 2:
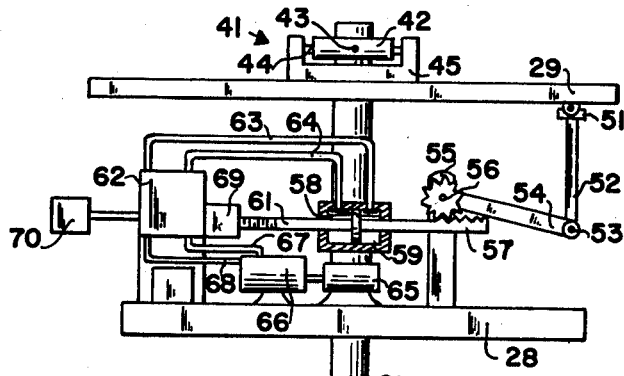
FIG. 2 is an elevational view of another embodiment of a motion system in accordance with this invention.
Figure 4:
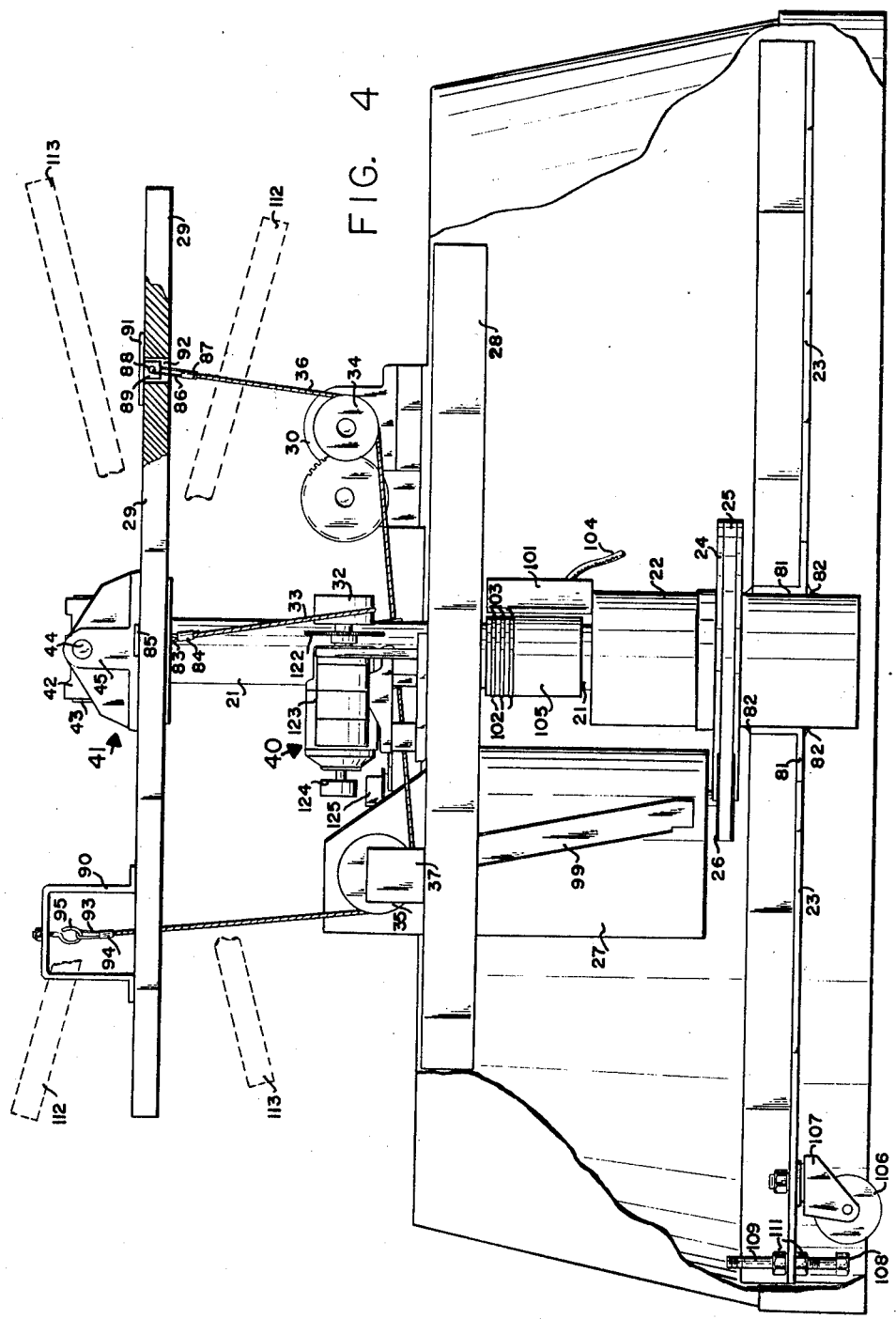
FIG. 4 is a side view, partially in section, showing the details of the preferred embodiment of the motion system in accordance with this invention.

Referring now to FIG. 2 which illustrates a system different from that of FIGS. 1 and 4, the lower platform 28 is supported on the rotating shaft 21. The upper platform 29 is supported on the shaft 21 by means of a universal joint 41 which comprises a collar 42 pivotally attached to the shaft 21 by a pin 43 and carried on a pin 44 which is supported in a U-housing 45. The pins 43 and 44 are at right angles to each other to provide universal movement of the platform 29 on the shaft 21. A second universal joint 51 is mounted on the underside of the upper platform 29 towards one edge thereof. An arm 52 is attached at one end to the universal joint 51 and is pivotally attached by a pin 53 at its other end to one end of a second arm 54. The other end of the arm 54 is pivotally supported on a support 55 and carries a pinion 56 attached thereto. The pinion 56 meshes with a rack 57 which has a piston 58 mounted thereon. The piston 58 is contained in a closed cylinder 59. The other end of the rack 57 comprises a lead screw 61 which is driven by means of a recirculating ball nut 69, coupled to a servomotor 70 through the spool of a rotary vlave 62. The piston 58 in the cylinder 59 divides that cylinder into two chambers. A tube 63 connects one of those chambers with one side of the rotary valve 62, and a tube 64 connects the other chamber with the other side of the rotary valve 62. An electric motor 65 drives a pump 66 which is connected to the rotary valve 62 by a pair of tubes 67 and 68. This entire assembly is supported on the platform 28.

In operation, the electric motor 65 drives the pump 66 at a constant speed to generate a fluid pressure and provide a fluid flow. When the valve 62 is in its neutral position, it passes the fluid from the pump 66 back to the pump, and no work is done. When the servomotor 70 is energized, it drives the spool of the rotary valve 62 and the recirculating-ball nut 69. Rotation of the nut 69 drives the lead screw 61 axially. Rotation of the spool of valve 62 diverts fluid from the pump 66 through tubes 63 and 64 to that side of the piston 58 to provide additional force on the lead screw 61 in the direction in which it is being driven. As the lead screw 61 is moved in and out, the rack 57 also moves, rotating the pinion 56 on the support 55. This causes the arm 54 to move upwardly or downwardly, driving the arm 52 against the platform 29. Thus, the platform 29 is caused to tilt, to produce motion in pitch or in roll. By supplying a second such system at right angles to the one shown, both pitch and roll can be achieved independently of each other. Yaw through a limited amount of movement is capable of being achieved in the same manner with the motor and drive means mounted on the lower platform 28 and operating against a fixed point not supported on the shaft 21.

Figure 3:
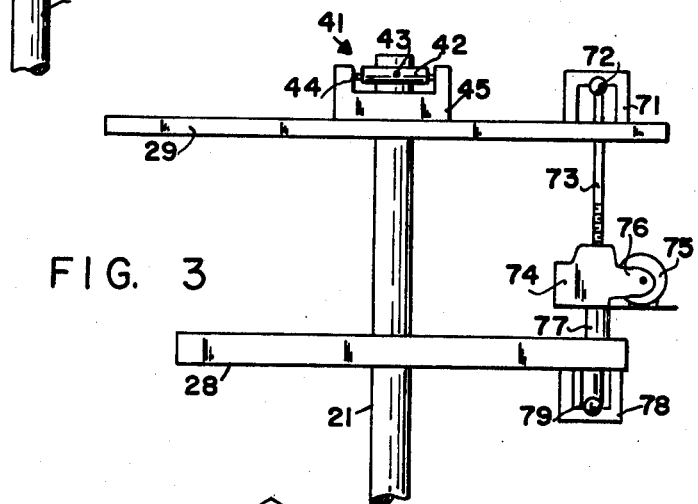
FIG. 3 is a further embodiment of a motion system in accordance with this invention.

Another embodiment of a motion system in accordance with this invention is shown in FIG. 3 in which a lower platform 28 is fixedly mounted on the shaft 21, and the upper platform 29 is attached to the shaft 21 by means of the universal joint 41 which has been described above. The upper platform 29 carries on its upper surface a U-shaped yoke 71 to which is attached a ball 72 which is mounted on one end of a lead screw 73. The lead screw 73 is threaded through a recirculating-ball nut contained within a housing 74. The nut is driven through worm gearing, not shown, by a motor 75. The housing 74 is supported on a column 77 which carries a ball 79 at its other end. The ball 79 is supported in a U-shaped yoke 78 which is mounted on the underside of the lower platform 28.

In operation, the electric motor 75 is energized to rotate the worm gearing in the gearhousing 76 and drive the ball nut in the housing 74. This causes the lead screw 73 to move upwardly or downwardly and causes the platform 29 to tilt. Since the other end of the support column 77 is carried by the platform 28, the platform 29 is tilted with respect to the platform 28, and since the platform 28 bears a fixed relation with the ground, the upper platform 29 and all that is carried on it is tilted with respect to the ground. A second similar mechanism provided on an axis at right angles to that of the mechanism shown can be operated to produce a tilt at right angles to that produced by the mechanism shown in FIG. 3. In this manner both pitch and roll can be readily achieved.

A preferred embodiment of the motion system of this invention is shown in FIG. 4. This is a more detailed showing of the equipment broadly illustrated in FIG. 1. The central shaft 21 upon which the upper platform 29 and the lower platform 28 are carried is rotatably supported in a main bearing assembly 22 which is mounted on legs 23 by any suitable means such as angle irons 81 welded to the bearing 22 at 82. The large pulley 24 is supported on the main bearing 22 and has a belt 25 wrapped around it and a second smaller pulley 26. The smaller pulley 26 is driven by a motor and gear assembly broadly shown at 27 mounted on the underside of the lower platform 28. The lower platform 28 is attached to and rotates with the main shaft 21 but it is not otherwise movable. Also mounted on the lower platform 28 is a motor-gear assembly 40 which drives a drum pulley 32 about which is wrapped a cable 33. The cable 33 is shown looped at 83 with a sleeve 84 firmly closing the loop 83. The loop 83 passes through an opening (not shown) in a pin 85 which is attached near one edge of the platform 29. The other end of the cable 33 is not shown in this figure but is similarly attached to another pin situated at the opposite edge of the platform 29. The platform 29 is supported on the shaft 21 by means of a universal joint 41 which comprises a collar 42 around the shaft 21 and pivotally attached thereto by means of a pin 43. A second pin 44 passes through the collar 42 at right angles to the pin 43 and is rotatably supported in a generally U-shaped frame 45 which is attached to the platform 29. An idler pulley 35 pivotally supported on a support 37 has a cable 36 passing over it and over a second drum pulley 34 driven by a second motor-gear assembly 30. One end of the cable 36 terminates in a loop 86 held together by a sleeve 87. The loop 86 passes through a hole 88, formed in the shaft 89 of a pin 91, which is inserted into an opening 92 in the platform 29. The other end of the cable 36 passes over the idler pulley 35 and is attached by means of a loop 93 which is fastened by a band 94 to an eye bolt 95 mounted on a bracket 90 on the upper platform 29 so that the top of the loop 93 is in the same horizontal plane as the pivots 43 and 44. The motor assembly, shown generally at 40 in FIG. 4, includes a brake drum 124 which may be surrounded by a suitable brake supported, for example, on a base 125. The motor assembly drives a gear 122 connected to an arrangement of potentiometers. This motor assembly is shown in more detail in FIG. 5, and will be described below. Electrical power is supplied to the rotating system by the contact of brushes 103 on individual slip rings 102 which are supported on an insulating drum 105 mounted on the shaft 21. The brushes 103 are supported in a terminal housing 101 which is mounted as a stationary part of the main bearing 22, and electrical power is connected into the housing 101 by means of an electric cable 104 which includes as many wires as necessary. The wires connecting the slip rings 102 to the electrical apparatus in the cockpit 11 may run through the interior of the hollow shaft 21. The entire assembly is carried by casters 106 mounted in rotating housings 107 on the legs 23. Only one such caster is shown, but each leg 23 carries at least one. For more permanent installations, a foot 108, which may be formed by the head of a bolt 109 passing through the leg 23 can be used to support the assembly. Nuts 111 maintain the bolt 109 in position on the leg 23.

Figure 5:
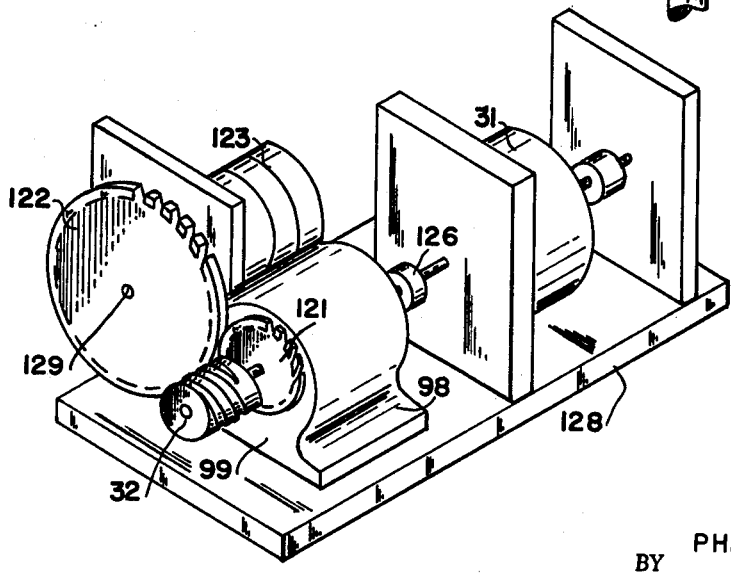
FIG. 5 is a perspective view of the motor drive train of the system shown in FIG. 4.

The motor assembly 40 is shown in perspective in larger scale in FIG. 5 and includes a motor 31, which may be a printed circuit motor, connected to the input shaft of a gear box 98 by means of a coupling 126. Vertical partitions 127 contains bearings which support the assembly on a base 128. The gear box 98 may be a harmonic drive, and its output shaft carries a spur gear 121 which meshes with and drives the gear 122. The gear 122 is carried on a rotatable shaft 129 which also supports a series of potentiometers 123. The drum 32 is also mounted on the output shaft of the gear box 98. The brake drum 124 is not shown in FIG. 5 since this is not necessary to the invention but may be used if desired.

Various systems for producing motion at low cost and over limited range have been discussed above. Other devices for producing this motion can also be considered. For example, a motor driving a sprocket wheel about which a sprocket chain passes has also been suggested. In addition, nylon belts or webbing can be used with suitable drive means, rubber V-belts can be used, link belts and similar devices may be substituted for the components described herein. In each of those systems which use a sprocket chain, a link belt, a V-belt, or nylon webbing, there is the same general disadvantage. Unless some slack is allowed on one side of the belt or chain, too heavy a load is placed upon the bearings. In any system which requires substantial reversal of the direction of the motion, this slack is a source of lost motion and results in a whipping action which places unnecessarily high loads on the system. Thus, considering the apparatus described herein, with the motor and other drive means mounted on the lower platform 28, any drive mechanism utilizing a power transmission train which includes slack will result in a null point where the direction o fmovement of the upper platform 29 is being changed and a subsequent jerking and transient oscillation when the lost motion in the power train is taken up. In addition, the mechanism shown in FIG. 2 which includes the rack and pinion requires fairly complex and expensive machined parts. This system of FIG. 2 also requires a substantial amount of space because the arm 54 cannot efficiently be deflected more than 45 degrees from the horizontal. At angles greater than 45 degrees, the forces transverse to the direction of movement become greater than the forces in the direction of movement, the equipment must be made much heavier to withstand these forces, and the operation becomes inefficient. In the system shown in FIG. 3, the mechanism is kept simple and reasonably efficient. However, the lead screw operation suffers from other disadvantages. A small transverse force on the screw, which forces may be encountered when the platform 29 is tilted, tends to cause the lead screw to bind in its guides, disrupting the operation and requiring greater strength in the parts than should ordinarily be necessary. The additional guiding structure which could overcome this defect would add to the cost, the complexity of the system, and the weight and space requirements. Further, due to the inherent inefficiency of worm gearing and the friction imposed by the lead screw configuration, response to acceleration forces is poor, and overpowering of the drive becomes necessary, resulting in an unstable drive system. In any system using gearing, the noise becomes excessive for training purposes where noise is an important consideration. In the following description of the operation of the equipment shown in FIG. 4, the advantages of this equipment over those mentioned above will be apparent.

In operation, yaw (or change of heading) is produced by the energization of the motor drive shown at 27. This causes the small pulley 26 to rotate and applies a force on the belt 25. Since the large pulley 24 is permanently affixed to the legs 23 and is stationary with respect to the floor, the effect of the torque applied from the pulley 26 to the belt 25 is to rotate the motor 27 around the pulley 24. Thus, as the motor 27 rotates, it pulls the platform 28 and the vertical shaft 21 around with it. Because of the manner in which the driving means walks around the stationary pulley 24 within the restraint established by the belt 25, there is very little lost motion in the arrangement of the yaw drive. In addition, the inertia of the rotating mechanism which includes the lower platform 28, the upper platform 29 and all of the equipment mounted thereon provides a smooth, gradual acceleration for realistic operation. Because of the large gearing ratio between the diameter of the small pulley 26 and that of the large pulley 24, the motor 27 can be quite small. The vertical shaft 21, which suports the entire assembly, is rotatably mounted in the large bearing 22 which is permanently affixed to the legs 25. The legs 23 may be formed of tubular material, angular members, or other similar suport structures and may be attached to the bearing assembly 22 by appropriate welds such as shown at 82. The bearing assembly 22 should be of proper length to provide a sufficient bearing span for the cantilevered rotating shaft 21 and all that is supports. The lower platform 28 is rigidly affixed by any suitable means to the vertical shaft 21 so that as the shaft 21 rotates, so does the lower platform 28, and it should preferably be mounted under the center of gravity of the system. An insulated drum 105 is mounted on the shaft 21 to provide a means for connecting electrical energy into the device. As mentioned above, electrical power may be brought in through the cable 104 into the housing 101 where the individual wires from the cable 104 are connected to separate brushes which may be of the spring type or carbon type. The brushes 101 are individually caused to bear against individual slip rings 102 mounted on the insulated drum 105. Since the drum 105 is constructed to rotate with the shaft 21, as the shaft 21 turns the slip rings 102 move under the brushes 101. Connections from the individual slip rings 102 may be made through the interior of the vertical shaft 21 and connected to the inside of the cockpit 11 to operate the controls and other devices contained therein. For pitch and roll, the appropriate motor drive shown at 40 and 30 is energized. This causes rotation of the drum pulley 32 and applies a force in one direction or the other on the cable 33. Assuming that the motor 31 is caused to rotate such that the loop 83 is pulled downwardly, then a downward force is applied by the cable 33 to that part of the platform 29 to which the loop 83 is attached. The platform 29 pivots on the pivot 43. As the motor 31 rotates, the drum pulley 32 moves throuhg at least a portion of its arc, pulling down the cable 33 on one side and paying it out on the other side. This permits the other side of the platform 29 to go up while the one side goes down. By considering the cable 36, the operation may be more readily understood. As the motor is rotated, the drum pulley 34 also rotates. Asuming that the drum pulley 34 rotates in a clockwise direction, the cable 36 will be pulled from the right, and the right-hand side of the platform 29 will be caused to lower while the cable 36 is, at the same time, paid out to the other side of the platform 29 permitting it to rise. When the right side of the platform 29 is pulled downward, it can assume the position shown in dashed lines and indicated at 112, pivoting about the pivot on the shaft 44. When the drum 35 rotates in a counter clockwise direction, then the platform 29 can be moved with its left side lowered in the position shown by the dashed lines 113. Since the platform 29 can pivot simultaneously about two different axes, those represented by the pivots 43 and 44, and since the entire assembly can rotate on the shaft 21, the platform 29 may move to any position incorporating three degrees of freedom at the same time. It should be noted that the cables 33 and 36 can be pulled taut during assembly, eliminating any lost motion by eliminating slack in the cable. In order to ensure the positive transmission of force from the drum pulleys 32 and 34 to the cables 33 and 36, balls may be swaged onto the cables 33 and 36 to fit into mating holes in the drums 32 and 34. The grooves in the pulleys are helixes, so the corresponding cable wraps around the pulley more than once. Since the only motion produced by this system is the rolling motion about pivots constructed for this purpose, there is virtually no noise in the operation of the motion system. To achieve the gear ratios desirable so that relatively high speed motors may be used to accomplish low speed motion of the platform 29, effective use has been made of devices known as harmonic drive gear boxes. In this type of device, an eliptical bearing is mounted within a progressively deformable cylinder with external tetth which meshes gear differs from the number of teeth in the external gear by a very small amount. For example, assuming that there are 200 teeth in the external gear, the internal gear may contain 198 teeth. As the eliptical bearing rotates, it tends to gradually deform the internal gear so that the two gears continually mesh 180° apart. In this manner, as the internal gear makes one complete revolution, the movement between the internal gear and the external gear amounts to the space of two teeth. Due to the meshing action of the two gears, the efficiency is high and the noise level is very low. In order to achieve the high starting torque required in a system of this type, pancake printed circuit motors have been used. These provide a very high torque combined with servomotor characteristics. This type of motor combined with the harmonic drive gear box produces a motion system which has a very high initial torque. The operation of the system of FIG. 4 is quiet, smooth, and effective, producing a very realistic motion to a vehicle body.

The above specification has described a new and improved motion system, particularly a motion system suitable for use in vehicle trainers. It is realized that a reading of the above description may indicate to those who are skilled in this art additional ways in which the principles of this invention may be used without departing from its spirit. It is, therefore, intended that this invention be limited only by the scope of the appended claims.

What is claimed is:

1. A motion system for a fixed-base vehicle trainer for providing motion about three rotational axes, said system comprising a fixed base, a vertical support means mounted on said fixed base to rotate about a vertical axis, a first platform fixedly arranged on said vertical support, a second platform mounted on said support to rotate about two axes at right angles to each other, first, second, and third drive means mounted on said first platform, means connecting said first drive means to said base so that when first drive means is energized said first platform rotates about said base on said vertical support, said second and third drive means being independently connected to pairs of spaced locations on said second platform so that when said second and third drive means are energized said second platform pivots about each of two perpendicular horizontal axes, said second drive means comprises a first electric motor, a power transmission train connected at one end to said first electric motor, a pulley connected to the other end of said power transmission train, and elongated tensioning means passing over said pulley and being connected at its two ends to spaced locations on said second platform.

2. The system defined in claim 1 wherein said two spaced locations on said second platform to which the ends of said elongated tensioning means is connected defines a line passing through one of said horizontal axes.

3. A motion system for a fixed-base vehicle trainer for providing rotational motion to a student station independently about any of three mutually perpendicular axes relative to a fixed base, said system comprising, in combination:

(a) platform means supporting said student station;
(b) first, second and third independently actuable drive means;
(c) first mounting means for fixedly mounting each said drive means on a common support spaced from said platform;
(d) second mounting means upon which said platform means is mounted for rotation about two axes and upon which said common support is fixedly mounted; and
(e) means connecting said first and second drive means with said platform to impart rotation thereto about said two axes in response to respective actuation of said first and second drive means, and connecting said third drive means to impart rotation about the third axis to said second mounting means and thereby said first mounting means and said platform.

4. The invention according to claim 3 wherein said third axis is the vertical axis.

5. The invention according to claim 4 wherein said platform means is mounted by means of a two-axis gimbal joint upon a vertical support rotatably mounted on said fixed base.

6. The invention according to claim 5 wherein said first, second and third drive means comprise motors mounted on support means affixed to and rotatable with said vertical support.

References Cited

UNITED STATES PATENTS

| | | | |
|---|---|---|---|
| 1,865,828 | 7/1932 | Buckley | 35—12 |
| 2,063,231 | 12/1936 | Custer | 35—12 |
| 2,930,144 | 3/1960 | Fogarty | 35—12 |

FOREIGN PATENTS

| | | |
|---|---|---|
| 834,662 | 5/1960 | Great Britain. |

EUGENE R. CAPOZIO, Primary Examiner

P. V. WILLIAMS, Assistant Examiner